United States Patent
Lin et al.

(10) Patent No.: US 12,183,022 B2
(45) Date of Patent: Dec. 31, 2024

(54) TOPOGRAPHIC ENVIRONMENT DETECTION METHOD AND SYSTEM BASED ON BINOCULAR STEREO CAMERA, AND INTELLIGENT TERMINAL

(71) Applicants: Beijing Smarter Eye Technology Co. Ltd, Beijing (CN); Shenzhen Pengcheng Electric Group Co., Ltd., Beijing (CN); Shenzhen Talent Database Data Technology Co., Ltd, Beijing (CN)

(72) Inventors: Wentao Lin, Beijing (CN); Hua Chai, Beijing (CN); Shanshan Pei, Beijing (CN); Shuhong Wu, Beijing (CN); Bin Chen, Beijing (CN); Yuzhi Lin, Beijing (CN); Ran Meng, Beijing (CN); Li Ma, Beijing (CN); Zhiwei He, Beijing (CN)

(73) Assignees: Beijing Smarter Eye Technology Co. Ltd, Beijing (CN); Shenzhen Pengcheng Electric Group Co., Ltd, Beijing (CN); Shenzhen Talent Database Data Technology Co., Ltd, Beijing (CN)

( * ) Notice: Subject to any disclaimer, the term of this patent is extended or adjusted under 35 U.S.C. 154(b) by 387 days.

(21) Appl. No.: 17/658,972

(22) Filed: Apr. 12, 2022

(65) Prior Publication Data
US 2023/0144678 A1 May 11, 2023

(30) Foreign Application Priority Data
Nov. 10, 2021 (CN) .......................... 202111324074.7

(51) Int. Cl.
*G06T 7/593* (2017.01)
*B60W 30/08* (2012.01)
(Continued)

(52) U.S. Cl.
CPC ............. *G06T 7/593* (2017.01); *B60W 30/08* (2013.01); *B60W 40/076* (2013.01);
(Continued)

(58) Field of Classification Search
CPC .......... G06T 7/593; G06T 2207/10028; G06T 2207/20081; B60W 30/08; B60W 40/076;
(Continued)

(56) References Cited

U.S. PATENT DOCUMENTS

| 10,929,694 B1* | 2/2021 | Zhang ..................... G06F 18/23 |
| 2019/0065868 A1* | 2/2019 | Tran ..................... G06V 20/588 |
| 2022/0262100 A1* | 8/2022 | Chandler ................. G06N 5/00 |

* cited by examiner

*Primary Examiner* — Casey L Kretzer
(74) *Attorney, Agent, or Firm* — NKL Law; Allen Xue

(57) ABSTRACT

The topographic environment detection method and a topographic environment detection system based on a binocular stereo camera, and an intelligent terminal are provided. The topographic environment detection method includes: obtaining a left-eye image and a right-eye image about a same road scenario, and processing the left-eye image and the right-eye image to obtain a dense disparity map of the road scenario; converting image information in a detection region into 3D point cloud information in a world coordinate system in accordance with the dense disparity map; fitting a road surface model in accordance with the 3D point cloud information; inputting an image in the detection region into a trained semantic segmentation model, and obtaining a segmentation result from the semantic segmentation model; and obtaining topographic information about the detection region in accordance with the segmentation result, and transmitting the topographic information to a vehicle assistant driving system.

10 Claims, 2 Drawing Sheets

(51) Int. Cl.
*B60W 40/076* (2012.01)
*B60W 50/14* (2020.01)
*G06V 20/56* (2022.01)
*H04N 13/128* (2018.01)

(52) U.S. Cl.
CPC ........... *B60W 50/14* (2013.01); *G06V 20/588* (2022.01); *H04N 13/128* (2018.05); *B60W 2050/146* (2013.01); *B60W 2552/25* (2020.02); *G06T 2207/10028* (2013.01); *G06T 2207/20081* (2013.01)

(58) Field of Classification Search
CPC ........... B60W 50/14; B60W 2050/146; B60W 2552/25; G06V 20/588; H04N 13/128
See application file for complete search history.

TOPOGRAPHIC ENVIRONMENT DETECTION METHOD AND SYSTEM BASED ON BINOCULAR STEREO CAMERA, AND INTELLIGENT TERMINAL

TECHNICAL FIELD

The present disclosure relates to the field of assistant driving technology, in particular to a topographic environment detection method and a topographic environment detection system based on a binocular stereo camera, and an intelligent terminal.

BACKGROUND

Along with the development of the automatic driving technology, the security and comfortableness of a vehicle are highly demanded. In addition, along with the development of the deep learning technology, a deep learning-based recognition method has been widely used in unmanned driving, security protection and industrial detection. In an automatic driving process, there is an urgent need to monitor in real time a topographic condition of a road, i.e., determine whether there are fluctuations and a fluctuation level, and transmit a detection result to a control system of the vehicle for subsequent processing, so as to improve the comfortableness and security of the vehicle.

SUMMARY

An object of the present disclosure is to provide a topographic environment detection method and a topographic environment detection system based on a binocular stereo camera, and an intelligent terminal, so as to monitor in real time a topographic condition of a road, i.e., determine whether there are fluctuations and a fluctuation level, and transmit a detection result to a control system of the vehicle for subsequent processing.

In one aspect, the present disclosure provides in some embodiments a topographic environment detection method based on a binocular stereo camera, including: obtaining a left-eye image and a right-eye image about a same road scenario, and processing the left-eye image and the right-eye image to obtain a dense disparity map of the road scenario; converting image information in a detection region into three-dimensional (3D) point cloud information in a world coordinate system in accordance with the dense disparity map; fitting a road surface model in accordance with the 3D point cloud information; inputting an image in the detection region into a trained semantic segmentation model, and obtaining a segmentation result from the semantic segmentation model; and obtaining topographic information about the detection region in accordance with the segmentation result, and transmitting the topographic information to a vehicle assistant driving system, so that the vehicle assistant driving system sends a driving instruction and/or warning information in accordance with the topographic information.

In a possible embodiment of the present disclosure, the converting the image information in the detection region into the 3D point cloud information in the world coordinate system in accordance with the dense disparity map includes: converting an image coordinate system of the dense disparity map into the world coordinate system in accordance with an imaging model of a binocular stereo vision system and a pinhole imaging model; intercepting the detection region from the dense disparity map with the detection region in a real world coordinate system as a reference; and converting the image information in the detection region into the 3D point cloud information through $Z=B*F/disp$, $X=(Img_x-cx)*b/disp$, and $Y=(Img_y-cy)*b/disp$, where B represents a distance between an optical center of a left camera and an optical center of a right camera in the binocular stereo vision system, F represents a focal length of the camera in the binocular stereo vision system, cx and cy represent coordinates of a principal point of the camera in the binocular stereo vision system, $Img_x$ and $Img_y$ are coordinates of a point in the image in the detection region, disp represents a disparity value of the point ($Img_x$, $Img_y$), X represents a horizontal distance between a 3D point and the camera in the world coordinate system, Y represents a longitudinal distance between the 3D point and the camera in the world coordinate system, and Z represents a depth distance between the 3D point and the camera in the world coordinate system.

In a possible embodiment of the present disclosure, the road surface model is expressed as $\cos\alpha*X+\cos\beta*Y+\cos\gamma*Z+D=0$, where $\cos\alpha$ represents a cosine of an angle between a normal vector of a road surface and an x-axis of the world coordinate system, $\cos\beta$ represents a cosine of an angle between the normal vector of the road surface and a y-axis of the world coordinate system, $\cos\gamma$ represents a cosine of an angle between the normal vector of the road surface and a z-axis of the world coordinate system, and D represents a distance between an origin of the world coordinate system and the road surface.

In a possible embodiment of the present disclosure, the semantic segmentation mode is trained through: analyzing a topographic condition which occurs for a road, and classifying common scenarios; photographing the scenarios to obtain a plurality of training images; with respect to each training image, labeling a target region to obtain a masked image, the target regions in different scenarios corresponding to different labeling features, each training image uniquely corresponding to one masked image; and performing a training operation in accordance with all the training images and the masked images, so as to obtain the semantic segmentation model.

In a possible embodiment of the present disclosure, the obtaining the topographic information about the detection region in accordance with the segmentation result and transmitting the topographic information to the vehicle assistant driving system so that the vehicle assistant driving system sends the driving instruction and/or warning information in accordance with the topographic information includes: determining that the detection region is a non-flat region in accordance with the segmentation result, projecting a 3D point onto a bird's-eye plane, and generating an elevation map on the bird's-eye plane in accordance with height information about each discrete point in the segmentation result; and calculating elevation information about a wheel region in accordance with the elevation map.

In a possible embodiment of the present disclosure, the determining that the detection region is the non-flat region in accordance with the segmentation result, projecting the 3D point onto the bird's-eye plane and generating the elevation map on the bird's-eye plane in accordance with height information about each discrete point in the segmentation result includes: when a segmented image pixel value is a value other than 1, 2 or 5, determining that the detection region is the non-flat region in accordance with the segmentation result from the semantic segmentation model; calculating a distance between the 3D point corresponding to the segmented image pixel value in the non-flat region and a plane where the road surface model is located through $A=\cos \alpha$, $B=\cos \beta$, $C=\cos \gamma$, and $$H = \frac{|A*X_0 + B*Y_0 + C*Z_0 + D|}{\sqrt{A^2 + B^2 + C^2}},$$

where $\cos \alpha$, $\cos \beta$, $\cos \gamma$ and D are parameters of the road surface model, $X_0$, $Y_0$ and $Z_0$ are coordinates of the discrete 3D point in the world coordinate system, H is a height of the discrete 3D point ($X_0$, $Y_0$ and $Z_0$) relative to a road surface; and projecting the 3D point onto the bird's-eye plane, and storing the height information about the discrete point whose segmented image pixel value is a value other than 1, 2 or 5 at a corresponding position, so as to generate the elevation map on the bird's-eye plane.

In a possible embodiment of the present disclosure, the calculating the elevation information about the wheel region in accordance with the elevation map includes: converting the world coordinate system into an image coordinate system in accordance with a wheel length and a distance between two wheels in the real world coordinate system through the imaging model of the binocular stereo vision system and the pinhole imaging mode, so as to obtain a position of the wheel region on the bird's-eye plane; and analyzing data in the wheel region in accordance with the elevation map on the bird's-eye plane, so as to obtain the elevation information about the wheel region. The elevation information includes a distance between an elevation change region and the camera, and a fluctuation level between the elevation change region and a ground point.

In another aspect, the present disclosure provides in some embodiments a topographic environment detection system based on a binocular stereo camera, including: a disparity map obtaining unit configured to obtain a left-eye image and a right-eye image about a same road scenario, and process the left-eye image and the right-eye image to obtain a dense disparity map of the road scenario; a coordinate conversion unit configured to convert image information in a detection region into 3D point cloud information in a world coordinate system in accordance with the dense disparity map; a road surface model obtaining unit configured to fit a road surface model in accordance with the 3D point cloud information; an image segmentation unit configured to input an image in the detection region into a trained semantic segmentation model, and obtain a segmentation result from the semantic segmentation model; and a result output unit configured to obtain topographic information about the detection region in accordance with the segmentation result, and transmit the topographic information to a vehicle assistant driving system, so that the vehicle assistant driving system sends a driving instruction and/or warning information in accordance with the topographic information.

In yet another aspect, the present disclosure provides in some embodiments an intelligent terminal, including a data collection device, a processor and a memory. The data collection device is configured to collect data, the memory is configured to store therein one or more program instructions, and the processor is configured to execute the one or more program instructions so as to implement the above-mentioned topographic environment detection method.

In still yet another aspect, the present disclosure provides in some embodiments a computer-readable storage medium storing therein one or more program instructions. The one or more program instructions are executed so as to implement the above-mentioned topographic environment detection method.

According to the topographic environment detection method, the topographic environment detection system and the intelligent terminal in the embodiments of the present disclosure, the image information in the detection region is converted into the 3D point cloud information in the world coordinate system in accordance with the dense disparity map. Next, the road surface model is fitted in accordance with the 3D point cloud information. Next, the image in the detection region is inputted into the trained semantic segmentation model to obtain the segmentation result from the semantic segmentation model. Then, the topographic information about the detection region is obtained in accordance with the segmentation result and transmitted to the vehicle assistant driving system, so that the vehicle assistant driving system sends the driving instruction and/or warning information in accordance with the topographic information. In this way, different topographic information is obtained through the semantic segmentation model and transmitted in time to the vehicle assistant driving system, so that the vehicle assistant driving system provides a corresponding strategy in accordance with features of the topographic information for the assistant driving. Through monitoring in real time the topographic condition of the road, it is able to determine whether there are fluctuations and the fluctuation level, and transmit the detection result to the control system of the vehicle for subsequent processing, thereby to improve the running stability and the comfortableness of the vehicle.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

An object of the present disclosure is to provide a topographic environment detection method, so as to detect in real time a road environment, and transmit a detection result to a vehicle assistant driving system for subsequent processing, thereby to optimize a road sensing function for the assistant driving, and improve the comfortableness and security.

Figure 1:
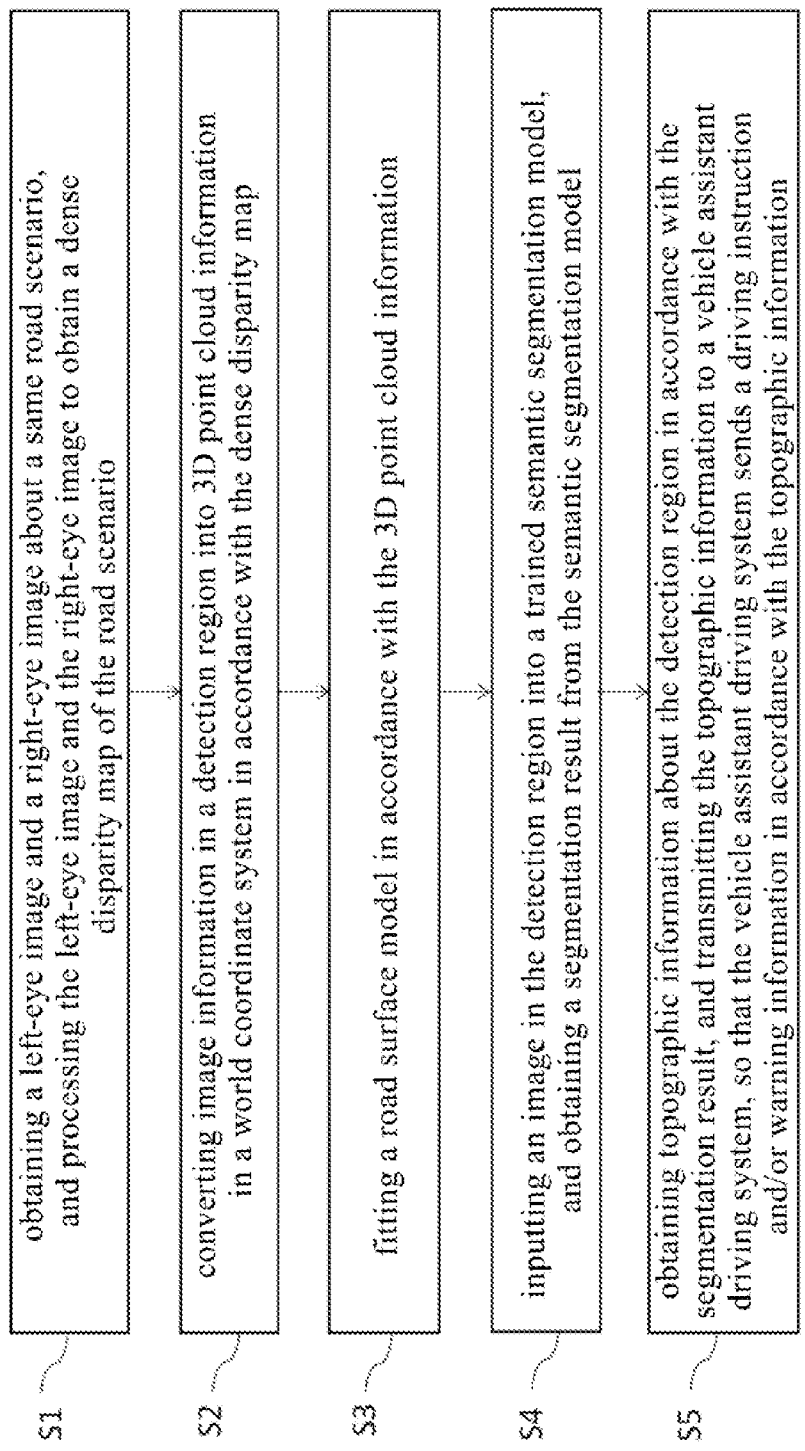
FIG. 1 is a flow chart of a topographic environment detection method based on a binocular stereo camera according to one embodiment of the present disclosure.

As shown in FIG. 1, the present disclosure provides in some embodiments a topographic environment detection method based on a binocular stereo camera, which includes the following steps.

S1: obtaining a left-eye image and a right-eye image about a same road scenario, and processing the left-eye image and the right-eye image to obtain a dense disparity map of the road scenario.

In other words, the left-eye image and the right-eye image about the same road scenario are obtained through a binocular stereo visual sensor, and then processed to obtain the dense disparity map of the road scenario.

In the embodiments of the present disclosure, a coordinate system of the binocular stereo camera is taken as a reference coordinate system. An extension direction of an optical axis of a left-eye camera is a Z-axis direction, i.e., a distance direction, an extension direction of a base line of the binocular stereo camera is an X-axis direction, i.e., a horizontal direction, and a vertical direction is a Y-axis direction, i.e., a longitudinal direction.

S2: converting image information in a detection region into 3D point cloud information in a world coordinate system in accordance with the dense disparity map. To be specific, a detection region is intercepted from an image with the detection region in the real world coordinate system as a reference, and the image information in the detection region is converted into the 3D point cloud information pts in the world coordinate system. For the image information, an image coordinate system is converted into the world coordinate system through an imaging model of a binocular stereo vision system and a pinhole imaging model.

In order to improve the accuracy of the 3D point cloud information and thereby ensure the accuracy of a calculation result, S2 specifically includes: S21 of converting an image coordinate system of the dense disparity map into the world coordinate system in accordance with the imaging model of the binocular stereo vision system and the pinhole imaging model; S22 of intercepting the detection region from the dense disparity map with the detection region in a real world coordinate system as a reference; and S23 of converting the image information in the detection region into the 3D point cloud information through $Z=B*F/disp$, $X=(Img_x-cx)*b/disp$, and $Y=(Img_y-cy)*b/disp$, where B represents a distance between an optical center of a left camera and an optical center of a right camera in the binocular stereo vision system, F represents a focal length of the camera in the binocular stereo vision system, cx and cy represent coordinates of a principal point of the camera in the binocular stereo vision system, $Img_x$ and $Img_y$ are coordinates of a point in the image in the detection region, disp represents a disparity value of the point ($Img_x$, $Img_y$), X represents a horizontal distance between a 3D point and the camera in the world coordinate system, Y represents a longitudinal distance between the 3D point and the camera in the world coordinate system, and Z represents a depth distance between the 3D point and the camera in the world coordinate system.

S3: fitting a road surface model in accordance with the 3D point cloud information.

To be specific, the road surface model is expressed as $\cos \alpha * X + \cos \beta * Y + \cos \gamma * Z + D = 0$, where $\cos \alpha$ represents a cosine of an angle between a normal vector of a road surface and an x-axis of the world coordinate system, $\cos \beta$ represents a cosine of an angle between the normal vector of the road surface and a y-axis of the world coordinate system, $\cos \gamma$ represents a cosine of an angle between the normal vector of the road surface and a z-axis of the world coordinate system, and D represents a distance between an origin of the world coordinate system and the road surface.

In order to obtain the accurate semantic segmentation model, a topographic condition which occurs for a road may be analyzed, and common scenarios are classified. Next, the scenarios may be photographed to obtain a plurality of training images. Then, with respect to each training image, a region of interest may be labeled to obtain a masked image.

To be specific, in order to improve the accuracy, the semantic segmentation mode is trained through: analyzing the topographic condition which occurs for the road, and classifying the common scenarios; photographing the scenarios to obtain the plurality of training images; with respect to each training image, labeling a target region to obtain a masked image, the target regions in different scenarios corresponding to different labeling features, each training image uniquely corresponding to one masked image; and performing a training operation in accordance with all the training images and the masked images, so as to obtain the semantic segmentation model.

For example, in a specific scenario, a pixel value of a bridge joint is labeled as 0, a pixel value of a common road surface is labeled as 1, a pixel value of a road sign is labeled as 2, a pixel value of a speed bump is labeled as 3, a pixel value of a manhole cover is labeled as 4, and a pixel value of a water-logging road is labeled as 5. In this way, it is able to obtain the masked image uniquely corresponding to each training image.

S4: inputting an image in the detection region into a trained semantic segmentation model, and obtaining a segmentation result from the semantic segmentation model.

Information about the road surface may be transmitted in real time to the assistant driving system and a driver in accordance with an identification result of the topographic condition, so as to improve the driving security. For example, in a water-logging scenario, it is impossible for a conventional binocular system to overcome a disparity error caused by a shadow in the water. However, when the water-logging scenario is identified through the semantic segmentation model, it is able to effectively correct an erroneous detection result at a water-logging region. In addition, it is able to sense the water-logging scenario in real time, and provide warning information to the vehicle in real time, thereby to improve the driving security.

S5: obtaining topographic information about the detection region in accordance with the segmentation result, and transmitting the topographic information to a vehicle assistant driving system, so that the vehicle assistant driving system sends a driving instruction and/or warning information in accordance with the topographic information.

In other words, different processings are performed for different pixel values in accordance with the segmentation result from the semantic segmentation model. To be specific, when a segmented image pixel value is 1, 2 or 5, the detection region may be determined as a flat region, and the fluctuation level may not be calculated. In the case of the other segmented image pixel value, a distance between a 3D point corresponding to the pixel value and a plane where the road surface model is located may be calculated.

Hence, S5 specifically includes the following steps.

S51: determining that the detection region is a non-flat region in accordance with the segmentation result, projecting a 3D point onto a bird's-eye plane, and generating an elevation map on the bird's-eye plane in accordance with height information about each discrete point in the segmentation result.

To be specific, when a segmented image pixel value is a value other than 1, 2 or 5, the detection region may be determined as the non-flat region in accordance with the segmentation result from the semantic segmentation model. Next, a distance between the 3D point corresponding to the segmented image pixel value in the non-flat region and a plane where the road surface model is located may be calculated through A=cos α, B=cos β, C=cos γ, and $$H = \frac{|A*X_0 + B*Y_0 + C*Z_0 + D|}{\sqrt{A^2 + B^2 + C^2}},$$

where cos α, cos β, cos γ and D are parameters of the road surface model, $X_0$, $Y_0$ and $Z_0$ are coordinates of the discrete 3D point in the world coordinate system, H is a height of the discrete 3D point ($X_0$, $Y_0$ and $Z_0$) relative to a road surface. Then, the 3D point may be projected onto the bird's-eye plane (i.e., an XOZ plane), and the height information about the discrete point whose segmented image pixel value is a value other than 1, 2 or 5 may be stored at a corresponding position, so as to generate the elevation map on the bird's-eye plane.

S52: calculating elevation information about a wheel region in accordance with the elevation map.

To be specific, S52 includes: S521 of converting the world coordinate system into an image coordinate system in accordance with a wheel length and a distance between two wheels in the real world coordinate system through the imaging model of the binocular stereo vision system and the pinhole imaging mode, so as to obtain a position of the wheel region on the bird's-eye plane; and S522 of analyzing data in the wheel region in accordance with the elevation map on the bird's-eye plane, so as to obtain the elevation information about the wheel region. The elevation information includes a distance between an elevation change region and the camera, and a fluctuation level between the elevation change region and a ground point.

According to the topographic environment detection method in the embodiments of the present disclosure, the image information in the detection region is converted into the 3D point cloud information in the world coordinate system in accordance with the dense disparity map. Next, the road surface model is fitted in accordance with the 3D point cloud information. Next, the image in the detection region is inputted into the trained semantic segmentation model to obtain the segmentation result from the semantic segmentation model. Then, the topographic information about the detection region is obtained in accordance with the segmentation result and transmitted to the vehicle assistant driving system, so that the vehicle assistant driving system sends the driving instruction and/or warning information in accordance with the topographic information. In this way, different topographic information is obtained through the semantic segmentation model and transmitted in time to the vehicle assistant driving system, so that the vehicle assistant driving system provides a corresponding strategy in accordance with features of the topographic information for the assistant driving. Through monitoring in real time the topographic condition of the road, it is able to determine whether there are fluctuations and the fluctuation level, and transmit the detection result to the control system of the vehicle for subsequent processing, thereby to improve the running stability and the comfortableness of the vehicle.

Figure 2:
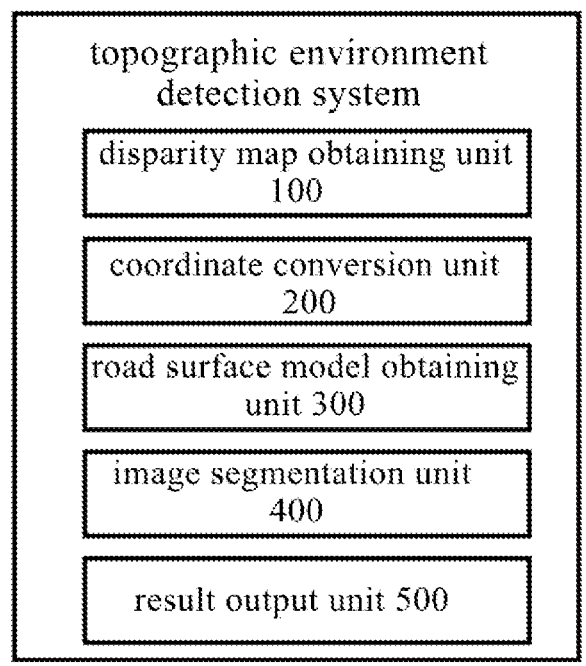
FIG. 2 is a block diagram of a topographic environment detection system based on a binocular stereo camera according to one embodiment of the present disclosure.

The present disclosure further provides in some embodiments a topographic environment detection system based on a binocular stereo camera, which, as shown in FIG. 2, includes: a disparity map obtaining unit 100 configured to obtain a left-eye image and a right-eye image about a same road scenario, and process the left-eye image and the right-eye image to obtain a dense disparity map of the road scenario; a coordinate conversion unit 200 configured to convert image information in a detection region into 3D point cloud information in a world coordinate system in accordance with the dense disparity map; a road surface model obtaining unit 300 configured to fit a road surface model in accordance with the 3D point cloud information; an image segmentation unit 400 configured to input an image in the detection region into a trained semantic segmentation model, and obtain a segmentation result from the semantic segmentation model; and a result output unit 500 configured to obtain topographic information about the detection region in accordance with the segmentation result, and transmit the topographic information to a vehicle assistant driving system, so that the vehicle assistant driving system sends a driving instruction and/or warning information in accordance with the topographic information.

In order to improve the accuracy of the 3D point cloud information and thereby ensure the accuracy of a calculation result, the coordinate conversion unit 200 is specifically configured to: convert an image coordinate system of the dense disparity map into the world coordinate system in accordance with an imaging model of a binocular stereo vision system and a pinhole imaging model; intercept the detection region from the dense disparity map with the detection region in a real world coordinate system as a reference; and convert the image information in the detection region into the 3D point cloud information through Z=B*F/disp, X=($Img_x$−cx)*b/disp, and Y=($Img_y$−cy)*b/disp, where B represents a distance between an optical center of a left camera and an optical center of a right camera in the binocular stereo vision system, F represents a focal length of the camera in the binocular stereo vision system, cx and cy represent coordinates of a principal point of the camera in the binocular stereo vision system, $Img_x$ and $Img_y$ are coordinates of a point in the image in the detection region, disp represents a disparity value of the point ($Img_x$, $Img_y$), X represents a horizontal distance between a 3D point and the camera in the world coordinate system, Y represents a longitudinal distance between the 3D point and the camera in the world coordinate system, and Z represents a depth distance between the 3D point and the camera in the world coordinate system.

The road surface model is expressed as cos α*X+cos β*Y+cos γ*Z+D=0, where cos α represents a cosine of an angle between a normal vector of a road surface and an x-axis of the world coordinate system, cos β represents a cosine of an angle between the normal vector of the road surface and a y-axis of the world coordinate system, cos γ represents a cosine of an angle between the normal vector of the road surface and a z-axis of the world coordinate system, and D represents a distance between an origin of the world coordinate system and the road surface.

In order to obtain the accurate semantic segmentation model, a topographic condition which occurs for a road may be analyzed, and common scenarios are classified. Next, the scenarios may be photographed to obtain a plurality of training images. Then, with respect to each training image, a region of interest may be labeled to obtain a masked image.

To be specific, the road surface model obtaining unit 300 is specifically configured to: analyze the topographic condition which occurs for the road, and classify the common scenarios; photograph the scenarios to obtain the plurality of training images; with respect to each training image, label a target region to obtain a masked image, the target regions in different scenarios corresponding to different labeling features, each training image uniquely corresponding to one masked image; and perform a training operation in accordance with all the training images and the masked images, so as to obtain the semantic segmentation model.

For example, in a specific scenario, a pixel value of a bridge joint is labeled as 0, a pixel value of a common road surface is labeled as 1, a pixel value of a road sign is labeled as 2, a pixel value of a speed bump is labeled as 3, a pixel value of a manhole cover is labeled as 4, and a pixel value of a water-logging road is labeled as 5. In this way, it is able to obtain the masked image uniquely corresponding to each training image.

Information about the road surface may be transmitted in real time to the assistant driving system and a driver in accordance with an identification result of the topographic condition, so as to improve the driving security. For example, in a water-logging scenario, it is impossible for a conventional binocular system to overcome a disparity error caused by a shadow in the water. However, when the water-logging scenario is identified through the semantic segmentation model, it is able to effectively correct an erroneous detection result at a water-logging region. In addition, it is able to sense the water-logging scenario in real time, and provide warning information to the vehicle in real time, thereby to improve the driving security.

Different processings are performed for different pixel values in accordance with the segmentation result from the semantic segmentation model. To be specific, when a segmented image pixel value is 1, 2 or 5, the detection region may be determined as a flat region, and the fluctuation level may not be calculated. In the case of the other segmented image pixel value, a distance between a 3D point corresponding to the pixel value and a plane where the road surface model is located may be calculated.

Hence, the result output unit 500 is specifically configured to determine that the detection region is a non-flat region in accordance with the segmentation result, project a 3D point onto a bird's-eye plane, and generate an elevation map on the bird's-eye plane in accordance with height information about each discrete point in the segmentation result.

To be specific, when a segmented image pixel value is a value other than 1, 2 or 5, the detection region may be determined as the non-flat region in accordance with the segmentation result from the semantic segmentation model. Next, a distance between the 3D point corresponding to the segmented image pixel value in the non-flat region and a plane where the road surface model is located may be calculated through A=cos α, B=cos β, C=cos γ, and $$H = \frac{|A*X_0 + B*Y_0 + C*Z_0 + D|}{\sqrt{A^2 + B^2 + C^2}},$$

where cos α, cos β, cos γ and D are parameters of the road surface model, $X_0$, $Y_0$ and $Z_0$ are coordinates of the discrete 3D point in the world coordinate system, H is a height of the discrete 3D point ($X_0$, $Y_0$ and $Z_0$) relative to a road surface.

Then, the 3D point may be projected onto the bird's-eye plane (i.e., an XOZ plane), and the height information about the discrete point whose segmented image pixel value is a value other than 1, 2 or 5 may be stored at a corresponding position, so as to generate the elevation map on the bird's-eye plane. Then, elevation information about a wheel region may be calculated in accordance with the elevation map.

The result output unit 500 is specifically configured to: convert the world coordinate system into an image coordinate system in accordance with a wheel length and a distance between two wheels in the real world coordinate system through the imaging model of the binocular stereo vision system and the pinhole imaging mode, so as to obtain a position of the wheel region on the bird's-eye plane; and analyze data in the wheel region in accordance with the elevation map on the bird's-eye plane, so as to obtain the elevation information about the wheel region. The elevation information includes a distance between an elevation change region and the camera, and a fluctuation level between the elevation change region and a ground point.

According to the topographic environment detection system in the embodiments of the present disclosure, the image information in the detection region is converted into the 3D point cloud information in the world coordinate system in accordance with the dense disparity map. Next, the road surface model is fitted in accordance with the 3D point cloud information. Next, the image in the detection region is inputted into the trained semantic segmentation model to obtain the segmentation result from the semantic segmentation model. Then, the topographic information about the detection region is obtained in accordance with the segmentation result and transmitted to the vehicle assistant driving system, so that the vehicle assistant driving system sends the driving instruction and/or warning information in accordance with the topographic information. In this way, different topographic information is obtained through the semantic segmentation model and transmitted in time to the vehicle assistant driving system, so that the vehicle assistant driving system provides a corresponding strategy in accordance with features of the topographic information for the assistant driving. Through monitoring in real time the topographic condition of the road, it is able to determine whether there are fluctuations and the fluctuation level, and transmit the detection result to the control system of the vehicle for subsequent processing, thereby to improve the running stability and the comfortableness of the vehicle.

The present disclosure further provides in some embodiments an intelligent terminal, which includes a data collection device, a processor and a memory. The data collection device is configured to collect data, the memory is configured to store therein one or more program instructions, and the processor is configured to execute the one or more program instructions so as to implement the above-mentioned topographic environment detection method.

The present disclosure further provides in some embodiments a computer-readable storage medium storing therein one or more program instructions. The one or more program instructions is executed by the topographic environment detection system so as to implement the above-mentioned topographic environment detection method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A topographic environment detection method based on a binocular stereo camera, comprising:
S1: obtaining a left-eye image and a right-eye image about a same road scenario, and processing the left-eye image and the right-eye image to obtain a dense disparity map of the road scenario;
S2: converting image information in a detection region into three-dimensional (3D) point cloud information in a world coordinate system in accordance with the dense disparity map;
S3: fitting a road surface model in accordance with the 3D point cloud information;
S4: inputting an image in the detection region into a trained semantic segmentation model, and obtaining a segmentation result from the semantic segmentation model; and
S5: obtaining topographic information about the detection region in accordance with the segmentation result, and transmitting the topographic information to a vehicle assistant driving system, so that the vehicle assistant driving system sends a driving instruction and/or warning information in accordance with the topographic information.

2. The topographic environment detection method according to claim 1, wherein S2 comprises:
converting an image coordinate system of the dense disparity map into the world coordinate system in accordance with an imaging model of a binocular stereo vision system and a pinhole imaging model;
intercepting the detection region from the dense disparity map with the detection region in a real world coordinate system as a reference; and
converting the image information in the detection region into the 3D point cloud information through $Z=B*F/disp$, $X=(Imgx-cx)*b/disp$, and $Y=(Imgy-cy)*b/disp$, where B represents a distance between an optical center of a left camera and an optical center of a right camera in the binocular stereo vision system, F represents a focal length of the camera in the binocular stereo vision system, cx and cy represent coordinates of a principal point of the camera in the binocular stereo vision system, Imgx and Imgy are coordinates of a point in the image in the detection region, disp represents a disparity value of the point (Imgx, Imgy), X represents a horizontal distance between a 3D point and the camera in the world coordinate system, Y represents a longitudinal distance between the 3D point and the camera in the world coordinate system, and Z represents a depth distance between the 3D point and the camera in the world coordinate system.

3. The topographic environment detection method according to claim 1, wherein the road surface model is expressed as $\cos\alpha*X+\cos\beta*Y+\cos\gamma*Z+D=0$, wherein $\cos\alpha$ represents a cosine of an angle between a normal vector of a road surface and an x-axis of the world coordinate system, $\cos\beta$ represents a cosine of an angle between the normal vector of the road surface and a y-axis of the world coordinate system, $\cos\gamma$ represents a cosine of an angle between the normal vector of the road surface and a z-axis of the world coordinate system, and D represents a distance between an origin of the world coordinate system and the road surface.

4. The topographic environment detection method according to claim 1, wherein the semantic segmentation model is trained using a method comprising:
analyzing a topographic condition which occurs for a road, and classifying common scenarios;
photographing the scenarios to obtain a plurality of training images;
with respect to each training image, labeling a target region to obtain a masked image, the target regions in different scenarios corresponding to different labeling features, each training image uniquely corresponding to one masked image; and
performing a training operation in accordance with all the training images and the masked images, so as to obtain the semantic segmentation model.

5. The topographic environment detection method according to claim 1, wherein S5 comprises:
determining that the detection region is a non-flat region in accordance with the segmentation result, projecting a 3D point onto a bird's-eye plane, and generating an elevation map on the bird's-eye plane in accordance with height information about each discrete point in the segmentation result; and calculating elevation information about a wheel region in accordance with the elevation map.

6. The topographic environment detection method according to claim 5, wherein the determining that the detection region is the non-flat region in accordance with the segmentation result, projecting the 3D point onto the bird's-eye plane and generating the elevation map on the bird's-eye plane in accordance with height information about each discrete point in the segmentation result comprises:

when a segmented image pixel value is a value other than 1, 2 or 5, determining that the detection region is the non-flat region in accordance with the segmentation result from the semantic segmentation model;

calculating a distance between the 3D point corresponding to the segmented image pixel value in the non-flat region and a plane where the road surface model is located through $A=\cos \alpha$, $B=\cos \beta$, $C=\cos \gamma$, and $H=|A*X\_0+B*Y\_0+C*Z\_0+D|-|/\sqrt{(A^2+B^2+C^2)}$, where $\cos \alpha$, $\cos \beta$, $\cos \gamma$ and D are parameters of the road surface model, X0, Y0 and Z0 are coordinates of a discrete 3D point in the world coordinate system, H is a height of the discrete 3D point (X0, Y0 and Z0) relative to a road surface; and projecting the discrete 3D point onto the bird's-eye plane, and storing the height information about the discrete 3D point whose segmented image pixel value is a value other than 1, 2 or 5 at a corresponding position, so as to generate the elevation map on the bird's-eye plane.

7. The topographic environment detection method according to claim 5, wherein the calculating the elevation information about the wheel region in accordance with the elevation map comprises: converting the world coordinate system into an image coordinate system in accordance with a wheel length and a distance between two wheels in the real world coordinate system through the imaging model of the binocular stereo vision system and the pinhole imaging mode to obtain a position of the wheel region on the bird's-eye plane; and analyzing data in the wheel region in accordance with the elevation map on the bird's-eye plane to obtain the elevation information about the wheel region, wherein the elevation information comprises a distance between an elevation change region and the camera, and a fluctuation level between the elevation change region and a ground point.

8. An intelligent terminal, comprising a data collection device, a processor and a memory, wherein the data collection device is configured to collect data, the memory is configured to store therein one or more program instructions, and the processor is configured to execute the one or more program instructions so as to implement the topographic environment detection method according to claim 1.

9. A non-transitory computer-readable storage medium storing therein one or more program instructions, wherein the one or more program instructions are executed so as to implement the topographic environment detection method according to claim 1.

10. A topographic environment detection system based on a binocular stereo camera, comprising:

a disparity map obtaining unit configured to obtain a left-eye image and a right-eye image about a same road scenario, and process the left-eye image and the right-eye image to obtain a dense disparity map of the road scenario;

a coordinate conversion unit configured to convert image information in a detection region into 3D point cloud information in a world coordinate system in accordance with the dense disparity map;

a road surface model obtaining unit configured to fit a road surface model in accordance with the 3D point cloud information;

an image segmentation unit configured to input an image in the detection region into a trained semantic segmentation model, and obtain a segmentation result from the semantic segmentation model; and a result output unit configured to obtain topographic information about the detection region in accordance with the segmentation result, and transmit the topographic information to a vehicle assistant driving system, so that the vehicle assistant driving system sends a driving instruction and/or warning information in accordance with the topographic information.

* * * * *